(12) United States Patent
Yoshimi et al.

(10) Patent No.: US 11,885,520 B2
(45) Date of Patent: Jan. 30, 2024

(54) MACHINE LEARNING APPARATUS FOR DETERMINING OPERATION CONDITION OF PRECOOLING OPERATION OR PREHEATING OPERATION OF AIR CONDITIONER

(71) Applicant: DAIKIN INDUSTRIES, LTD., Osaka (JP)

(72) Inventors: Manabu Yoshimi, Osaka (JP); Tadafumi Nishimura, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 198 days.

(21) Appl. No.: 17/437,773

(22) PCT Filed: Mar. 13, 2020

(86) PCT No.: PCT/JP2020/011038
§ 371 (c)(1),
(2) Date: Sep. 9, 2021

(87) PCT Pub. No.: WO2020/189544
PCT Pub. Date: Sep. 24, 2020

(65) Prior Publication Data
US 2022/0154962 A1 May 19, 2022

(30) Foreign Application Priority Data
Mar. 18, 2019 (JP) ................. 2019-049521

(51) Int. Cl.
*F24F 11/64* (2018.01)
*F24F 11/06* (2006.01)
(Continued)

(52) U.S. Cl.
CPC .............. *F24F 11/06* (2013.01); *F24F 11/48* (2018.01); *G05D 23/1917* (2013.01);
(Continued)

(58) Field of Classification Search
CPC ........ F24F 11/64; F24F 11/48; F24F 2110/10; F24F 2110/12; F24F 2130/10;
(Continued)

(56) References Cited

U.S. PATENT DOCUMENTS 10,648,684 B2    5/2020  Ito et al.
2013/0338839 A1* 12/2013  Rogers ................. F24F 11/57
                                                700/278
(Continued)

FOREIGN PATENT DOCUMENTS

CA    3 058 373 A1    10/2018
EP    3 076 091 A1    10/2016
(Continued)

OTHER PUBLICATIONS

Wei, T., Wang, Y. and Zhu, Q., Jun. 2017. Deep reinforcement learning for building HVAC control. In Proceedings of the 54th annual design automation conference 2017 (pp. 1-6). (Year: 2017).*
(Continued)

*Primary Examiner* — Alicia M. Choi
(74) *Attorney, Agent, or Firm* — Global IP Counselors, LLP

(57) ABSTRACT

A machine learning apparatus determines an operation condition of a precooling operation or preheating operation of an air conditioner. The machine learning apparatus includes an acquisition unit and a learning unit. The acquisition unit acquires, as state variables, room temperature data at a time of the precooling operation or preheating operation, set temperature data, and outside air temperature data. The learning unit learns the operation condition of the precooling operation or preheating operation based on the state variables, a room temperature after start of the precooling operation or preheating operation, and a set temperature.

9 Claims, 5 Drawing Sheets

(51) Int. Cl.
| | |
|---|---|
| *F24F 11/48* | (2018.01) |
| *G05D 23/19* | (2006.01) |
| *F24F 130/20* | (2018.01) |
| *F24F 140/00* | (2018.01) |
| *F24F 130/10* | (2018.01) |
| *F24F 110/10* | (2018.01) |
| *F24F 110/12* | (2018.01) |
| *F24F 140/20* | (2018.01) |

(52) U.S. Cl.
CPC ....... *F24F 2110/10* (2018.01); *F24F 2110/12* (2018.01); *F24F 2130/10* (2018.01); *F24F 2130/20* (2018.01); *F24F 2140/00* (2018.01); *F24F 2140/20* (2018.01)

(58) Field of Classification Search
CPC ............... F24F 2130/20; F24F 2140/00; F24F 2140/20; F24F 2140/60; F24F 11/30; F24F 11/46; F24F 11/006; F24F 11/63; G05D 23/1917; G06N 3/08
See application file for complete search history.

(56) References Cited

U.S. PATENT DOCUMENTS

| | | | | |
|---|---|---|---|---|
| 2015/0330652 | A1* | 11/2015 | Kim | F24F 11/30 |
| | | | | 700/276 |
| 2016/0223218 | A1* | 8/2016 | Barrett | F24F 11/52 |
| 2017/0227950 | A1 | 8/2017 | Kinoshita et al. | |
| 2018/0100662 | A1* | 4/2018 | Farahmand | G05B 19/0428 |
| 2019/0017720 | A1 | 1/2019 | Otsuki et al. | |
| 2019/0101302 | A1* | 4/2019 | Rainone | F24F 11/0001 |
| 2019/0353378 | A1* | 11/2019 | Ramamurti | G05B 15/02 |
| 2019/0377305 | A1* | 12/2019 | Petrus | G05B 13/041 |
| 2020/0025402 | A1* | 1/2020 | Bell | G05D 23/1923 |
| 2020/0240659 | A1* | 7/2020 | Maruyama | F24F 11/64 |
| 2021/0302044 | A1* | 9/2021 | Sato | F24F 11/63 |

FOREIGN PATENT DOCUMENTS

| | | |
|---|---|---|
| EP | 3 296 654 A1 | 3/2018 |
| JP | 60-142136 A | 7/1985 |
| JP | 62-9137 A | 1/1987 |
| JP | 8-210689 A | 8/1996 |
| JP | 2953317 B2 | 9/1999 |
| JP | 2001-21198 A | 1/2001 |
| JP | 2012-83001 A | 4/2012 |
| JP | 2016-61487 A | 4/2016 |
| JP | 2017-142595 A | 8/2017 |
| JP | 6270996 A | 1/2018 |
| JP | 6270996 B2 | 1/2018 |
| JP | 2018-48750 A | 3/2018 |
| JP | 2018-71853 A | 5/2018 |
| JP | 6328049 A | 5/2018 |
| JP | 2019-522163 A | 8/2019 |
| WO | 2015/079502 A1 | 6/2015 |

OTHER PUBLICATIONS

International Search Report of corresponding PCT Application No. PCT/JP2020/011038 dated Jun. 16, 2020.
International Preliminary Report of corresponding PCT Application No. PCT/JP2020/011038 dated Sep. 30, 2021.
European Search Report of corresponding EP Application No. 20 77 4451.7 dated Mar. 31, 2022.

* cited by examiner

MACHINE LEARNING APPARATUS FOR DETERMINING OPERATION CONDITION OF PRECOOLING OPERATION OR PREHEATING OPERATION OF AIR CONDITIONER

CROSS-REFERENCE TO RELATED APPLICATIONS

This U.S. National stage application claims priority under 35 U.S.C. § 119(a) to Japanese Patent Application No. 2019-049521, filed in Japan on Mar. 18, 2019, the entire contents of which are hereby incorporated herein by reference.

BACKGROUND TECHNICAL FIELD

Field of the Invention

The present disclosure relates to a machine learning apparatus for determining an operation condition of a precooling operation or preheating operation of an air conditioner.

Background Information

Japanese Patent No. 6270996M discloses absence control for controlling an air conditioner during the time when a user is absent in an air-conditioning-target space. The absence control is performed in order to improve comfortableness at the time when the user is back to the air-conditioning-target space. During the absence control, in order to determine the length of time for operating the air conditioner and the load processing amount of the air conditioner, the length of an absent time, framework performance of a building including the air-conditioning-target space, and an air conditioning load at the start of occupancy are referred to.

SUMMARY

Technical Problem

The above patent literature does not refer to machine learning.

Solution to Problem

A machine learning apparatus according to a first aspect determines an operation condition of a precooling operation or preheating operation of an air conditioner. The machine learning apparatus includes an acquisition unit and a learning unit. The acquisition unit acquires room temperature data at the time of the precooling operation or preheating operation, set temperature data, and outside air temperature data as state variables. The learning unit learns the operation condition of the precooling operation or preheating operation on the basis of the state variables, a room temperature after start of the precooling operation or preheating operation, and a set temperature.

According to this configuration, the operation condition of the precooling operation or preheating operation is derived by machine learning. Thus, the user's comfortableness or energy saving effect is increased.

A machine learning apparatus according to a second aspect is the machine learning apparatus according to the first aspect, in which the operation condition of the precooling operation or preheating operation includes an operation start time.

A machine learning apparatus according to a third aspect is the machine learning apparatus according to the first or second aspect, in which the air conditioner includes a utilization heat exchanger, a utilization fan, and a compressor. The operation condition of the precooling operation or preheating operation includes at least one of a temperature of the utilization heat exchanger, a number of rotations of the utilization fan, and a number of rotations of the compressor.

A machine learning apparatus according to a fourth aspect is the machine learning apparatus according to the third aspect, in which the acquisition unit further acquires, as the state variables, at least one of data regarding a heat processing amount of the air conditioner, data of a framework surrounding a space, air of which is conditioned by a utilization unit of the air conditioner, outside air temperature data before the precooling operation or preheating operation, solar radiation data before the precooling operation or preheating operation, weather data before the precooling operation or preheating operation, and a season or month at the time of the precooling operation or preheating operation.

A machine learning apparatus according to a fifth aspect is the machine learning apparatus according to the fourth aspect, in which the data regarding the heat processing amount of the air conditioner includes at least one of the number of rotations of the compressor, the temperature of the utilization heat exchanger, and a suction temperature measured at a suction side of the utilization heat exchanger.

A machine learning apparatus according to a sixth aspect is the machine learning apparatus according to the fourth or fifth aspect, in which the data of the framework includes at least one of an age of the framework, a heat insulating property of the framework, window specifications of the framework, a size of a room constituted by the framework, a ventilation amount of the framework, an orientation of the framework, and air-conditioner operation information of a room adjacent to the room constituted by the framework.

A machine learning apparatus according to a seventh aspect is the machine learning apparatus according to any one of the first to sixth aspects, in which the learning unit further includes a reward setting unit. The reward setting unit determines a reward on the basis of the room temperature after the start of the precooling operation or preheating operation and the set temperature. The learning unit learns the operation condition of the precooling operation or prehearing operation on the basis of the state variables and the reward.

A machine learning apparatus according to an eighth aspect is the machine learning apparatus according to the seventh aspect, in which the reward setting unit determines the reward further on the basis of an electric energy required until a time after the start of the precooling operation or preheating operation.

A machine learning apparatus according to a ninth aspect is the machine learning apparatus according to the eighth aspect, in which the time after the start of the precooling operation or preheating operation is an end time of the precooling operation or preheating operation.

A machine learning apparatus according to a tenth aspect is the machine learning apparatus according to the eighth or ninth aspect, in which the reward setting unit increases the reward if a difference between the room temperature at the end time of the precooling operation or preheating operation and the set temperature is small, or increases the reward if the electric energy is small.

A machine learning apparatus according to an eleventh aspect is the machine learning apparatus according to any one of the seventh to tenth aspects, in which the learning unit further includes an action value function holding unit that holds an action value function, and an action value function updating unit that updates the action value function. The action value function indicates an expected value of the reward that is expected to be received with respect to the operation condition. The action value function updating unit updates the action value function on the basis of the reward that is actually obtained.

DETAILED DESCRIPTION OF
EMBODIMENT(S) EMBODIMENTS (1) Overall Configuration

Figure 1:
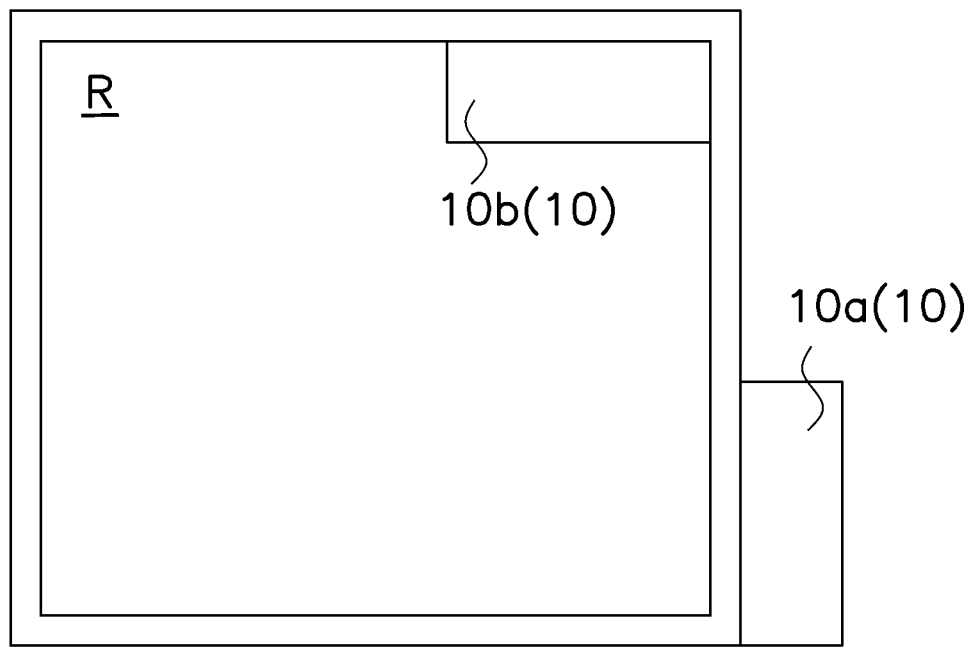
FIG. 1 is a schematic diagram illustrating the configuration of a machine learning apparatus 100.

FIG. 1 illustrates a machine learning apparatus 100. The machine learning apparatus 100 includes an air conditioner 10. The air conditioner 10 includes a heat source unit 10a and a utilization unit 10b. The air conditioner 10 is installed in a room R that is an air conditioning target.

The machine learning apparatus 100 can perform absence control. The absence control is control of the air conditioner 10 performed while a user is absent in an air-conditioning-target space (the room R). A cooling operation performed in the absence control is referred to as a precooling operation. A heating operation performed in the absence control is referred to as a preheating operation.

(2) Detailed Configuration (2-1) Air Conditioner 10

Figure 2:
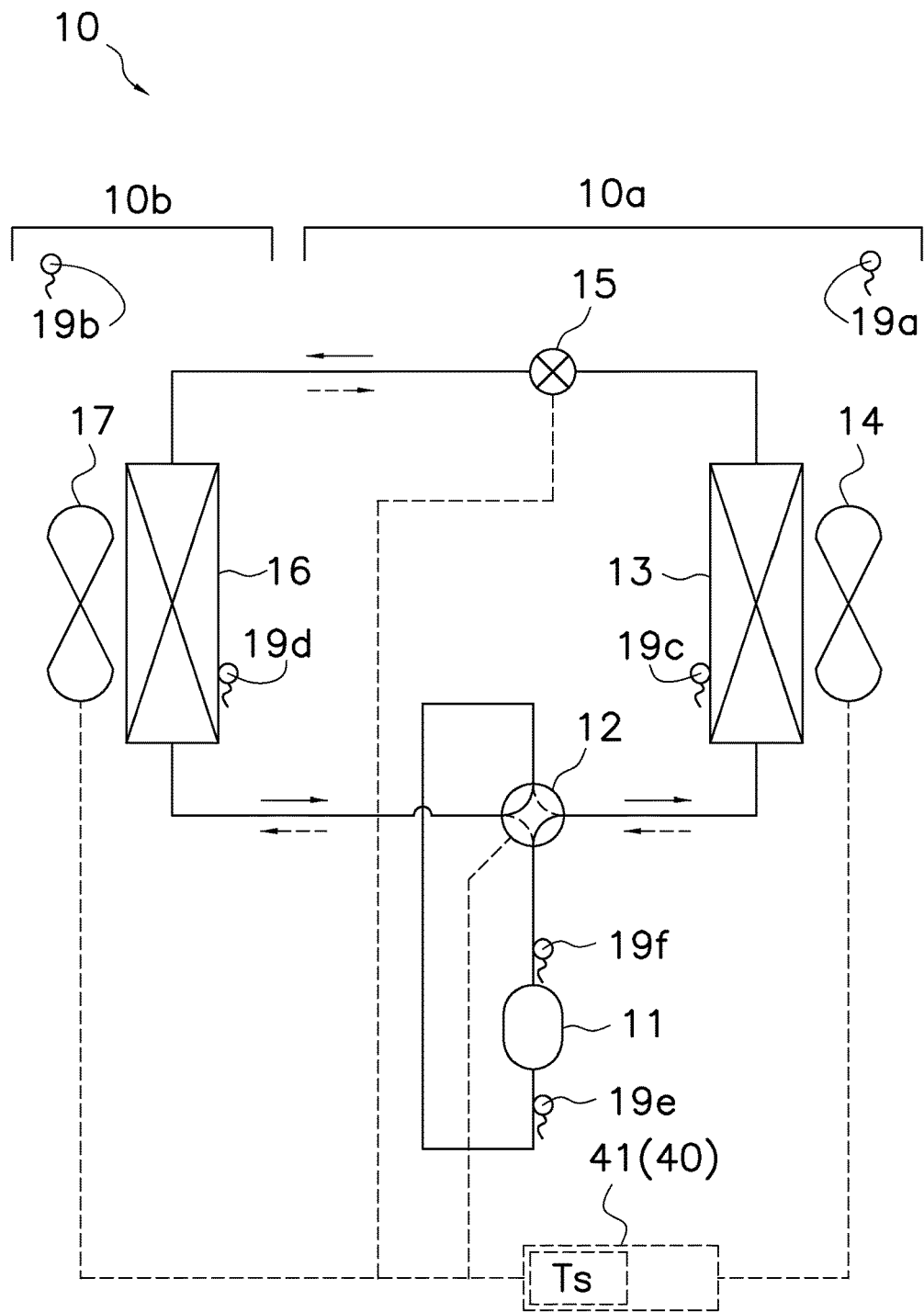
FIG. 2 is a schematic diagram illustrating the configuration of an air conditioner 10.

The air conditioner 10 conditions air in the room R. FIG. 2 illustrates the configuration of the air conditioner 10. The air conditioner 10 includes a compressor 11, a four-way switching valve 12, a heat-source heat exchanger 13, a heat-source fan 14, an expansion valve 15, a utilization heat exchanger 16, a utilization fan 17, and a control unit 40. The air conditioner 10 further includes an outside air temperature sensor 19a, a room temperature sensor 19b, a heat-source heat exchanger temperature sensor 19c, a utilization heat exchanger temperature sensor 19d, a compressor suction temperature sensor 19e, a compressor discharge temperature sensor 19f, a pressure sensor, which is not illustrated, and the like. In a case of a cooling operation, refrigerant circulates in the direction of the solid arrows. In a case of a heating operation, refrigerant circulates in the direction of the broken arrows.

In the configuration in FIG. 2, the single heat source unit 10a and the single utilization unit 10b are connected. Instead, a configuration in which a plurality of utilization units 10b are connected to the single heat source unit 10a may be employed. The control unit 40 may be mounted on any of the heat source unit 10a and the utilization unit 10b. Alternatively, the control unit 40 may be mounted on both the heat source unit 10a and the utilization unit 10b separately.

(2-2) Control Unit 40

Figure 3:
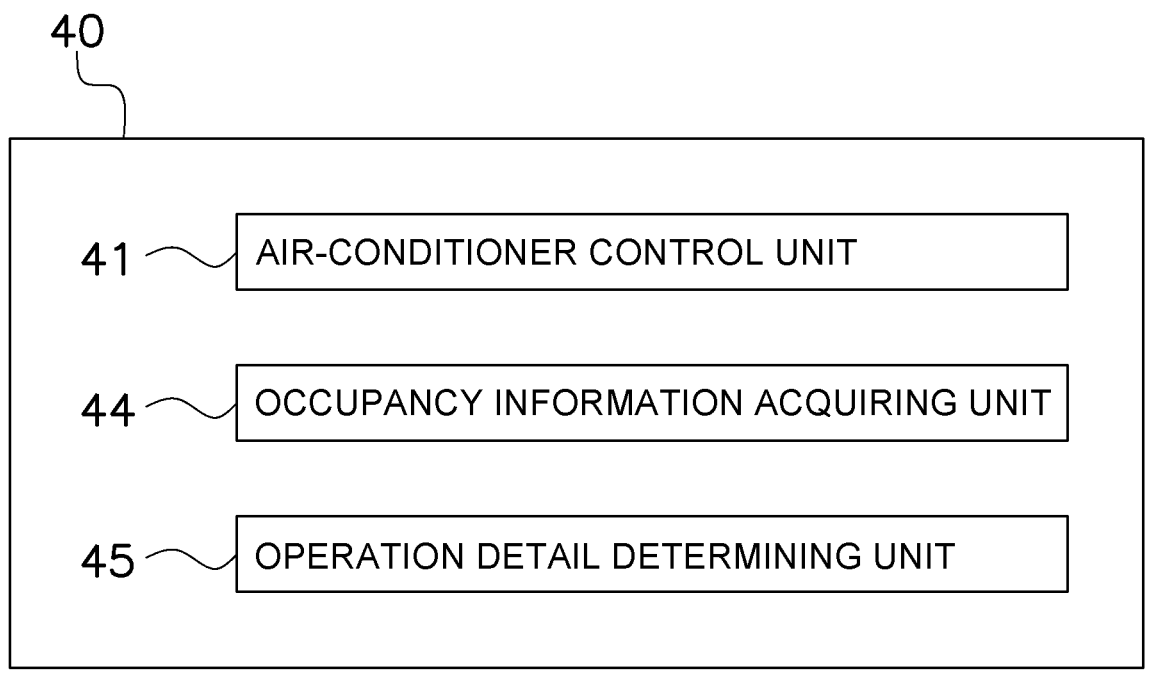
FIG. 3 is a block diagram of a control unit 40.

FIG. 3 is a block diagram of the control unit 40. The control unit 40 is, for example, a microcomputer. By executing a dedicated program, the control unit 40 functions as an air-conditioner control unit 41, an occupancy information acquiring unit 44, and an operation detail determining unit 45.

The air-conditioner control unit 41 controls the air conditioner 10. Specifically, as illustrated in FIG. 2, the air-conditioner control unit 41 controls the compressor 11, the four-way switching valve 12, the heat-source fan 14, the expansion valve 15, and the utilization fan 17. Furthermore, the air-conditioner control unit 41 acquires temperature information from the temperature sensors 19a to 19f. Furthermore, the air-conditioner control unit 41 stores set temperature data Ts that is input by a user. Furthermore, the air-conditioner control unit 41 obtains power consumption of the air conditioner 10.

The occupancy information acquiring unit 44 illustrated in FIG. 3 acquires information about the time at which the user goes out of the room R and the time at which the user is back to the room R on the basis of, for example, statistical results of output of a human detecting sensor. Alternatively, the occupancy information acquiring unit 44 may receive, by manual input, the information about the time at which the user goes out of the room R and the time at which the user is back to the room R.

The operation detail determining unit 45 synthetically determines how to operate each of the air conditioner 10 during a precooling operation or preheating operation to be performed.

(3) Details of Operation Detail Determining Unit 45

(3-1) Configuration

Figure 4:
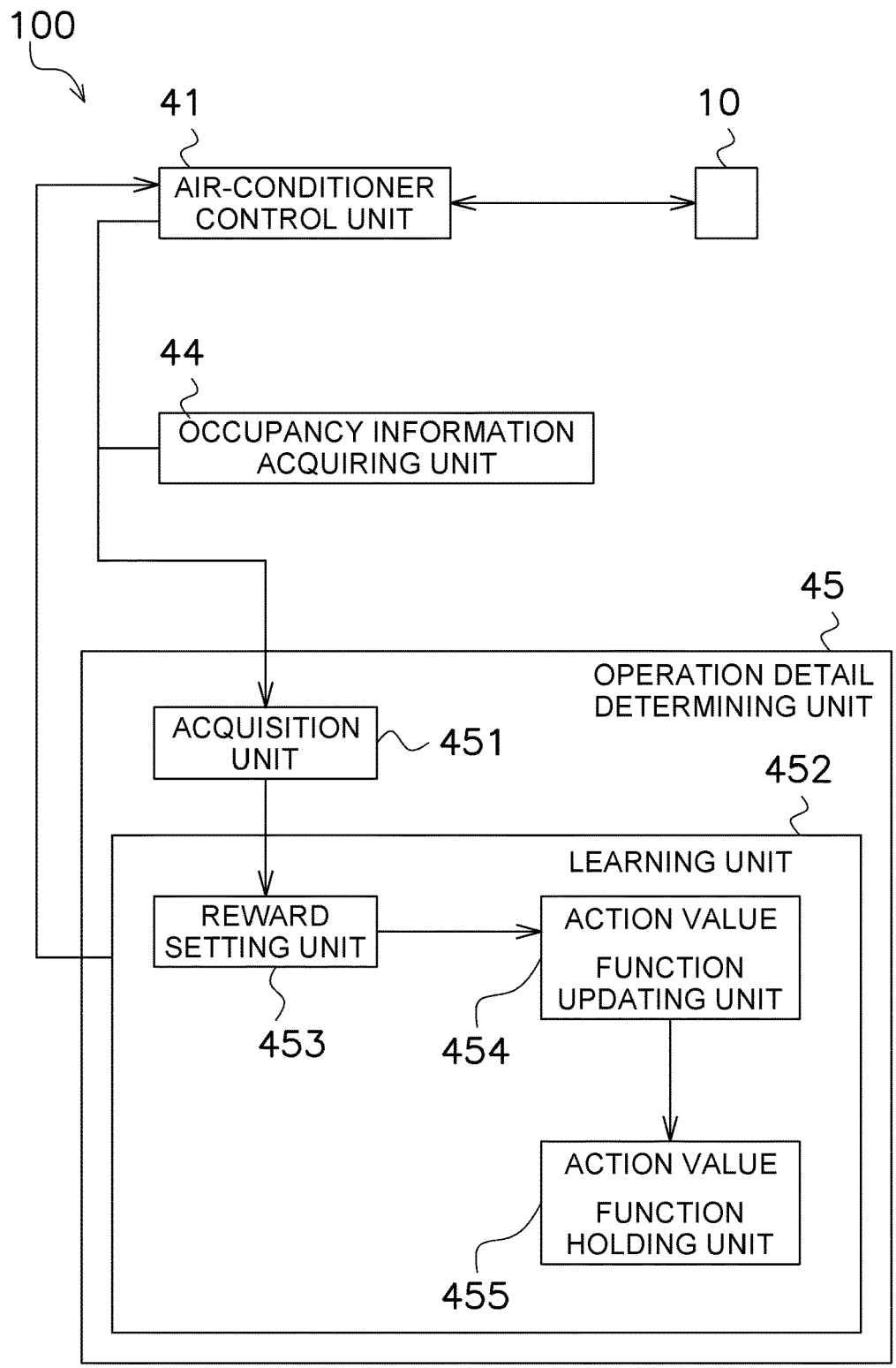
FIG. 4 is a block diagram of the machine learning apparatus 100.

FIG. 4 is a block diagram of the machine learning apparatus 100. The operation detail determining unit 45 includes an acquisition unit 451 and a learning unit 452.

The acquisition unit 451 acquires, as state variables, output of the temperature sensors 19a to 19f of the air conditioner 10, output of the occupancy information acquiring unit 44, and other signals. For example, on the basis of output of the room temperature sensor 19b and the outside air temperature sensor 19a, the acquisition unit 451 acquires room temperature data and outside air temperature data, respectively, as state variables. The acquisition unit 451 further acquires the set temperature data Ts held by the air-conditioner control unit 41 as a state variable. Furthermore, on the basis of output of the occupancy information acquiring unit 44, the acquisition unit 451 acquires the time until the user is back to the room R as a state variable. The acquisition unit 451 may acquire, as a state variable, at least one of:

Data regarding a heat processing amount of the air conditioner 10 (e.g., the number of rotations of the compressor 11, the temperature of the utilization heat exchanger 16, a suction temperature measured at a suction side of the utilization heat exchanger 16 (i.e., room temperature)), Data of a framework surrounding the space (the room R) the air of which is conditioned by the utilization unit 10b of the air conditioner 10 (e.g., the age of the framework, a heat insulating property of the framework, window specifications of the framework, the size of the room constituted by the framework, a ventilation amount of the framework, the orientation of the framework, air-conditioner operation information of a room adjacent to the room R constituted by the framework), Outside air temperature data before the precooling operation or preheating operation, Solar radiation data before the precooling operation or preheating operation, Weather data before the precooling operation or preheating operation, and A season or month at the time of the precooling operation or preheating operation.

On the basis of a training data set consisted of the state variables, the room temperature data at a certain time after start of the precooling operation or preheating operation, and the set temperature data Ts, the learning unit 452 learns an operation condition of the precooling operation or preheating operation. The operation condition herein may include an operation start time of the precooling operation or preheating operation. Alternatively, the operation condition may include at least one of the temperature of the utilization heat exchanger 16, the number of rotations of the utilization fan 17, and the number of rotations of the compressor 11.

The learning unit 452 includes a reward setting unit 453, an action value function updating unit 454, and an action value function holding unit 455. The reward setting unit 453 calculates a reward on the basis of the following values when a precooling operation or preheating operation is performed.

(A) Difference between the room temperature and the set temperature at the time the user is back to the room R (B) Electric energy required until a certain time after start of the precooling operation or preheating operation (e.g., until the end of the precooling operation or preheating operation)

Specifically, the reward setting unit 453 gives a large reward when "(A) Difference" is small, and gives a small reward when "(A) Difference" is large. In addition, the reward setting unit 453 gives large reward when "(B) Electric energy" is small, and gives a small reward when "(B) Electric energy" is large.

The action value function holding unit 455 holds a function (action value function) for calculating how to control the precooling operation or preheating operation. The function herein includes numerical values (action value table) expressed in the form of a table. The function may indicate an expected value of the reward that is expected to be received with respect to the operation condition.

On the basis of the state variables acquired by the acquisition unit 451 and the reward calculated by the reward setting unit 453, the action value function updating unit 454 updates an action value function held by the action value function holding unit 455.

In this manner, the learning unit 452 learns the operation condition of the precooling operation or preheating operation on the basis of the state variables and the reward. The learning unit 452 may update the action value function in real time. Furthermore, the learning unit 452 may compute the state variables acquired from the acquisition unit 451 by multilayer neural network for updating. At this time, the learning unit 452 preferably performs reinforcement learning.

(3-2) Operation Details

The operation detail determining unit 45 determines operation details of the air conditioner 10. The operation details of the air conditioner 10 herein may include an operation start time of the air conditioner 10. Alternatively, the operation conditions may include at least one of the temperature of the utilization heat exchanger 16, the number of rotations of the utilization fan 17, and the number of rotations of the compressor 11.

(4) Processing

Figure 5:
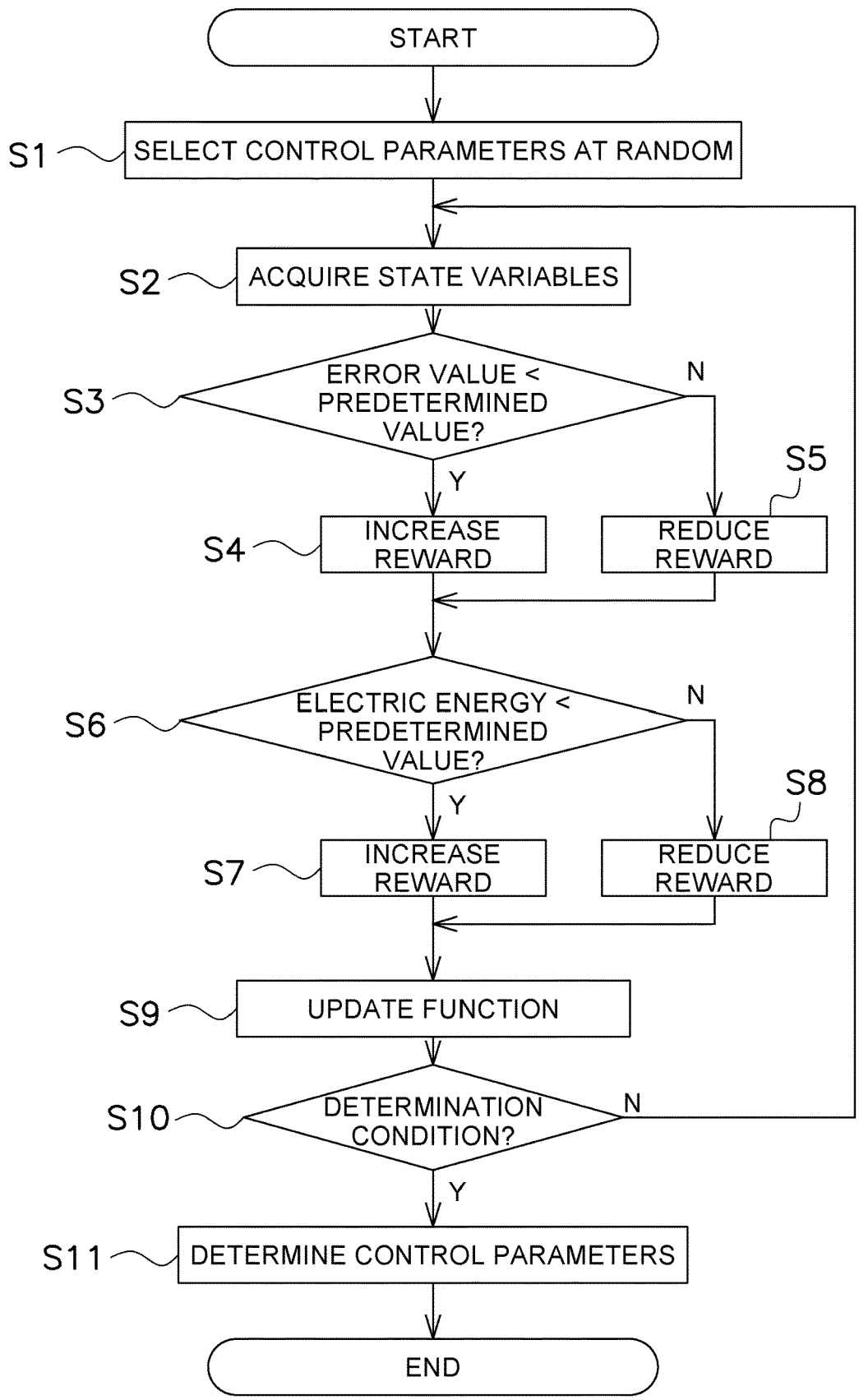
FIG. 5 is a flowchart illustrating processing in the machine learning apparatus 100.

FIG. 5 is a flowchart illustrating processing in the machine learning apparatus 100. An initial value of "action" in reinforcement learning may be selected at random. In step S1, control parameters for the air conditioner 10 are selected at random.

In step S2, the acquisition unit 451 acquires state variables. Herein, the state variables include output of at least part of the temperature sensors 19a to 19f of the air conditioner 10, output of the occupancy information acquiring unit 44, and other signals. Specifically, the state variables include the room temperature, the outside air temperature, power consumption of the air conditioner 10, at the time of step S2, the time until the user is back to the room R, and the like.

In step S3, the reward setting unit 453 determines whether the difference between the room temperature and the set temperature at the time the user is back to the room R is less than a predetermined value when a precooling operation or preheating operation is performed. If it is determined that the difference is less than the predetermined value, in step S4, the reward setting unit 453 increases the reward. On the other hand, if it is determined that the difference is greater than or equal to the predetermined value, in step S5, the reward setting unit 453 reduces the reward.

If, in step S6, the reward setting unit 453 determines that the electric energy required for the precooling operation or preheating operation is less than a predetermined value when the precooling operation or preheating operation is performed, in step S7, the reward setting unit 453 increases the reward. On the other hand, if it is determined that the electric energy is greater than or equal to the predetermined value, in step S8, the reward setting unit 453 reduces the reward.

In step S9, on the basis of the state variables and the reward, the action value function updating unit 454 updates the function (action value function) for calculating control parameters.

In step S10, it is determined whether a determination condition is satisfied. The determination condition may be input of a command by a user. Alternatively, the determination condition may be an event that a predetermined relational expression is satisfied. If the determination condition is satisfied, the processing advances to step S11. If the determination condition is not satisfied, the process returns to step S2.

In step S11, on the basis of the function, the action value function updating unit 454 determines control parameters for a precooling operation or preheating operation by which a greatest reward is to be obtained.

(5) Characteristics

The operation condition of a precooling operation or preheating operation is derived by machine learning. Thus, the user's comfortableness or energy saving effect is increased.

(6) Modification

Instead of (A) Difference between the room temperature and the set temperature at the time the user is back to the room R, (C) Time difference between the time the user is back to the room R and the time the room temperature actually reaches the set temperature may be used for processing.

(7) Conclusion

Although the embodiment of the present disclosure has been described above, it should be understood that various changes can be made on the forms and details without departing from the spirit and scope of the present disclosure described in the scope of claims.

REFERENCE SIGNS LIST 10 air conditioner
11 compressor
13 heat-source heat exchanger
14 heat-source fan
15 expansion valve
16 utilization heat exchanger
17 utilization fan
19a outside air temperature sensor
19b room temperature sensor
40 control unit
100 machine learning apparatus
451 acquisition unit
452 learning unit
453 reward setting unit
454 action value function updating unit
455 action value function holding unit
R room
Ts set temperature data

CITATION LIST

Patent Literature

Patent Literature 1: Japanese Patent No. 6270996

What is claimed is:

1. A machine learning apparatus for determining an operation condition of a precooling operation or preheating operation of an air conditioner, the machine learning apparatus comprising:
   a controller including a computer, the controller being configured to
   execute an absence control while a user is absent, the absence control including at least one of the precooling operation or the preheating operation;
   acquire, as state variables, room temperature data at a time of the precooling operation or preheating operation, set temperature data, and outside air temperature data;
   learn the operation condition of the precooling operation or preheating operation based on the state variables and a reward, the reward is based on a room temperature at an end time of the precooling operation or preheating operation, a set temperature, and an electric energy required until the end time of the precooling operation or preheating operation;
   at the end time of the precooling operation or preheating operation, the controller being further configured to
   increase the reward if a difference between the room temperature and the set temperature is smaller than a first predetermined value and decrease the reward if the difference is equal to or larger than the first predetermined value, or
   increase the reward if the electric energy is smaller than a second predetermined value and decrease the reward if the electric energy is equal to or larger than a second predetermined value.

2. The machine learning apparatus according to claim 1, wherein the operation condition of the precooling operation or preheating operation includes an operation start time.

3. The machine learning apparatus according to claim 2, wherein
   the air conditioner includes
   a utilization heat exchanger,
   a utilization fan, and
   a compressor, and
   the operation condition of the precooling operation or preheating operation includes at least one of
   a temperature of the utilization heat exchanger,
   a number of rotations of the utilization fan, and
   a number of rotations of the compressor.

4. The machine learning apparatus according to claim 1, wherein
   the air conditioner includes
   a utilization heat exchanger,
   a utilization fan, and
   a compressor, and
   the operation condition of the precooling operation or preheating operation includes at least one of
   a temperature of the utilization heat exchanger,
   a rotational speed of the utilization tan, and
   a rotational speed of the compressor.

5. The machine learning apparatus according to claim 4, wherein
   the controller is further configured to acquire, as the state variables, at least one of
   data regarding a heat processing amount of the air conditioner,
   data of a framework surrounding a space, air of which is conditioned by a utilization unit of the air conditioner,
   outside air temperature data before the precooling operation or preheating operation,
   solar radiation data before the precooling operation or preheating operation,
   weather data before the precooling operation or preheating operation, and
   a season or month at the time of the precooling operation or preheating operation.

6. The machine learning apparatus according to claim 5, wherein
   the data regarding the heat processing amount of the air conditioner includes at least one of
   the rotational speed of the compressor,
   the temperature of the utilization heat exchanger, and
   a suction temperature measured at a suction side of the utilization heat exchanger.

7. The machine learning apparatus according to claim 6, wherein
   the data of the framework includes at least one of
   an age of the framework,
   a heat insulating property of the framework,
   window specifications of the framework,
   a size of a room constituted by the framework,
   a ventilation amount of the framework,
   an orientation of the framework, and
   air-conditioner operation information of a room adjacent to the room constituted by the framework.

8. The machine learning apparatus according to claim 5, wherein
   the data of the framework includes at least one of
   an age of the framework,
   a heat insulating property of the framework,
   window specifications of the framework,
   a size of a room constituted by the framework,
   a ventilation amount of the framework,
   an orientation of the framework, and
   air-conditioner operation information of a room adjacent to the room constituted by the framework.

9. The machine learning apparatus according to claim 1, wherein
- the controller is further configured to hold an action value function, and to update the action value function,
- the action value function indicates an expected value of the reward that is expected to be received with respect to the operation condition, and
- the controller is further configured to update the action value function based on the reward that is actually obtained.

* * * * *